US007103456B2

(12) United States Patent
Bloch et al.

(10) Patent No.: US 7,103,456 B2
(45) **Date of Patent: *Sep. 5, 2006**

(54) PCMCIA CARD FOR REMOTELY COMMUNICATING AND INTERFACING WITH AIRCRAFT CONDITION MONITORING SYSTEMS

(75) Inventors: Laurent Bloch, Dallas, TX (US); Jean-Michel Toussaint, Irving, TX (US)

(73) Assignee: SAGEM Avionics, Inc., Grand Prairie, TX (US)

( * ) Notice: Subject to any disclaimer, the term of this patent is extended or adjusted under 35 U.S.C. 154(b) by 200 days.

This patent is subject to a terminal disclaimer.

(21) Appl. No.: 10/821,846

(22) Filed: Apr. 12, 2004

(65) Prior Publication Data

US 2005/0228559 A1 Oct. 13, 2005

(51) Int. Cl.
*G01C 23/00* (2006.01)
*G08B 21/00* (2006.01)
*G08B 23/00* (2006.01)

(52) U.S. Cl. ............................ 701/3; 701/36; 340/945

(58) Field of Classification Search .................... 701/3, 701/29–36, 14; 244/1 R, 75.1, 189; 340/945, 340/500; 702/127

See application file for complete search history.

(56) References Cited

U.S. PATENT DOCUMENTS

| | | | |
|---|---|---|---|
| 5,794,145 | A | 8/1998 | Milam |
| 6,047,165 | A | 4/2000 | Wright et al. |
| 6,104,914 | A | 8/2000 | Wright et al. |
| 6,108,523 | A | 8/2000 | Wright et al. |
| 6,148,179 | A | 11/2000 | Wright et al. |
| 6,154,637 | A | 11/2000 | Wright et al. |
| 6,160,998 | A | 12/2000 | Wright et al. |
| 6,163,681 | A | 12/2000 | Wright et al. |
| 6,167,238 | A | 12/2000 | Wright |
| 6,167,239 | A | 12/2000 | Wright et al. |
| 6,173,159 | B1 | 1/2001 | Wright et al. |
| 6,278,913 | B1 | 8/2001 | Jiang |
| 6,308,045 | B1 | 10/2001 | Wright et al. |
| 6,353,734 | B1 | 3/2002 | Wright et al. |
| 6,363,248 | B1 | 3/2002 | Silverman |
| 6,487,500 | B1 | 11/2002 | Lemelson et al. |
| 6,516,272 | B1 | 2/2003 | Lin |
| 6,522,867 | B1 | 2/2003 | Wright et al. |
| 6,650,970 | B1 | 11/2003 | Odashima et al. |
| 6,671,589 | B1 | 12/2003 | Holst et al. |

(Continued)

FOREIGN PATENT DOCUMENTS

| | | |
|---|---|---|
| EP | 1130555 | 9/2001 |

(Continued)

OTHER PUBLICATIONS

International Search Report issued Feb. 28, 2006 in counterpart PCT application under application No. PCT/US05/12339.

*Primary Examiner*—Yonel Beaulieu
(74) *Attorney, Agent, or Firm*—Andrews Kurth LLP

(57) ABSTRACT

A method and corresponding system use a Personal Computer Memory Card International Association (PCMCIA) card to remotely communicate and interface with flight performance data on an aircraft. The PCMCIA card can be plugged into an Aircraft Condition Monitoring Systems (ACMS) using a card interface. The method and system offer a global communication architecture that can be implemented with existing ACMS devices and with any flight data acquisition unit (FDAU) equipped with a storage card, such as a PCMCIA card. The PCMCIA card offers real-time wireless communication between the ACMS on an aircraft and a ground station without any hardware and/or software modifications to the ACMS.

36 Claims, 9 Drawing Sheets

U.S. PATENT DOCUMENTS

| | | | | |
|---|---|---|---|---|
| 2002/0018008 | A1 | 2/2002 | Wright et al. | |
| 2003/0003872 | A1 * | 1/2003 | Brinkley et al. | 455/66 |
| 2003/0100978 | A1 | 5/2003 | Wright et al. | |
| 2003/0148735 | A1 | 8/2003 | Wright et al. | |
| 2003/0148736 | A1 | 8/2003 | Wright et al. | |
| 2003/0203734 | A1 | 10/2003 | Igloi et al. | |
| 2005/0228558 | A1 * | 10/2005 | Valette et al. | 701/33 |

FOREIGN PATENT DOCUMENTS

| | | |
|---|---|---|
| EP | 1199863 | 4/2002 |
| EP | 1368725 | 12/2003 |
| GB | 2302744 | 1/1997 |
| WO | WO 02/079918 | 10/2002 |

* cited by examiner

PCMCIA CARD FOR REMOTELY COMMUNICATING AND INTERFACING WITH AIRCRAFT CONDITION MONITORING SYSTEMS

RELATED APPLICATION

This application is related to commonly assigned U.S. patent application Ser. No. 10/821,845, entitled "METHOD AND SYSTEM FOR REMOTELY COMMUNICATING AND INTERFACING WITH AIRCRAFT CONDITION MONITORING SYSTEMS," filed on the same day herewith by inventors Patrick Valette and Stephane Larose, the subject matter of which is incorporated herein by reference.

TECHNICAL FIELD

The technical field relates to Aircraft Condition Monitoring Systems (ACMS), and, in particular, to a Personal Computer Memory Card International Association (PCMCIA) card for remotely communicating and interfacing with all existing ACMS devices.

BACKGROUND

Aircraft Condition Monitoring Systems (ACMS) are used by commercial airlines to provide flight performance data for aircrafts to monitor aircraft engine performance. FIG. 1 illustrates a current communication schema of an ACMS 110. A flight data acquisition unit (FDAU) 100 collects Federal Aviation Regulations (FAR) §121.344 parameters for maintenance and engineering. The FDAU 100 includes an ACMS 110 that records flight performance data from a plurality of acquisition equipments, such as sensors on an aircraft. The acquisition equipments monitor signals supplied from a variety of transducers distributed throughout the aircraft and provide digital data representative of the aircraft's flight performance based upon such transducer inputs. The ACMS 110 uses the flight performance data to generate real-time ACMS reports based on FAR §121.344 parameters. As flight performance is obtained by the acquisition equipments, the flight performance data is stored in an attendant, physically robust, flight data recorder (FDR) 114.

The flight performance data may be transmitted to an aircraft communication and reporting system (ACARS) management unit 116 for real-time transmission of, for example, snapshot position parameters, to the ground. The flight performance data is also provided to a pilot interface, such as a multifunction condition and display unit (MCDU) 118. The MCDU 118 can display real-time parameters for maintenance and piloting. The MCDU 118 may include a cockpit printer and an interface display unit (not shown).

The flight performance data are typically recorded back to a quick access recorder (QAR) 117. The QAR records the flight performance data on a data media, such as a PCMCIA card 130. The PCMCIA card 130 can be plugged into a slot 135 on the ACMS 110. The PCMCIA card 130 is then taken to a ground station 160 for engine performance monitoring and flight performance data analysis. The ground station 160 includes a ground support equipment (GSE) 145 and an analysis ground station (AGS) 140. A data loader 122 uses a disk to load software upgrades onto the ACMS 110 from the GSE 145. An Ethernet connection 120 may be provided to the FDAU 100 to connect the ACMS 110 to the aircraft network (not shown).

To improve aircraft safety, Federal Aviation Administration (FAA) recommends that the airlines check the information provided by the FDAU 100 at regular intervals. One approach is to allow aircraft safety personnel to gain access to the flight performance data by physically removing the PCMCIA card 130. In other words, a mechanic needs to go on board an aircraft to load new software or to retrieve flight performance data from the ACMS 110. Therefore, communication of the flight performance data is deferred because no remote real-time access is possible. In addition, with the large volume of aircraft traffic, manual retrieval and replacement of the PCMCIA card 130 is very time and manpower intensive. In addition, this approach is prone to substantial misidentification and aircraft association errors.

SUMMARY

A Personal Computer Memory Card International Association (PCMCIA) card remotely communicates and interfaces with flight performance data on an aircraft. The PCMCIA card can be plugged into an Aircraft Condition Monitoring System (ACMS) using a card interface. The ACMS generates an ACMS report after one or more exclusive conditions are fulfilled. The PCMCIA card includes a central processing unit (CPU) providing processing power and wireless transmission functionality. The PCMCIA card uses the CPU to detect whether the ACMS report is generated. The PCMCIA card further includes a wireless interface controlled by the CPU. The interface connects the CPU to a wireless network. The PCMCIA card further includes a memory coupled to the CPU through a communication bus. The memory stores flight performance data. The CPU wirelessly transmits the flight performance data stored in the memory to a ground station through the wireless network after the one or more exclusive conditions are fulfilled and the ACMS report is generated.

In another embodiment, the PCMCIA card remotely communicates and interfaces with flight performance data on an aircraft through a wired network. The PCMCIA card can be plugged into an ACMS using a card interface. The ACMS generates an ACMS report after one or more exclusive conditions are fulfilled. The PCMCIA card includes a CPU providing processing power and wired transmission functionality. The PCMCIA card uses the CPU to detect whether the ACMS report is generated. The PCMCIA card further includes an Ethernet interface coupled to the CPU. The Ethernet interface connects the CPU to a wired network on the aircraft. The PCMCIA card further includes a memory coupled to the CPU through a communication bus. The memory stores flight performance data. The CPU transmits the flight performance data stored in the memory to the wired network after the one or more exclusive conditions are fulfilled and the ACMS report is generated. The wired network then transmits the flight performance data to a ground station.

DESCRIPTION OF THE DRAWINGS

The embodiments of the exemplary Personal Computer Memory Card International Association (PCMCIA) card for remotely communicating and interfacing with an Aircraft Condition Monitoring Systems (ACMS) will be described in detail with reference to the following figures, in which like numerals refer to like elements, and wherein.

DETAILED DESCRIPTION

A method and corresponding system use a Personal Computer Memory Card International Association (PCMCIA) card to remotely communicate and interface with flight performance data on an aircraft. The PCMCIA card can be plugged into an Aircraft Condition Monitoring Systems (ACMS) using a card interface. The method and system offer a global communication architecture that can be implemented with existing ACMS devices and with any flight data acquisition unit (FDAU) equipped with a storage card, such as a PCMCIA card. The PCMCIA card offers real-time wireless communication between the ACMS on an aircraft and a ground station without any hardware and/or software modifications to the ACMS.

The method and system provide remote real-time access to the ACMS and ACMS peripherals, such as digital flight data recorder (DFDR), aircraft communication and reporting system (ACARS), multifunction condition and display unit (MCDU), and other line replaceable units (LRUs). The method and system eliminate the need for manual retrieval and replacement of data media carrying flight performance data. As a result, an airline can remotely perform maintenance acts on an aircraft, such as emulating the ACMS peripherals or downloading the flight performance data, from a research and development (R&D) room on the other side of the earth. By instantly communicating the flight performance data, the airline can closely monitor aircraft engine performance and perform maintenance wherever needed, rather than on a fixed schedule. Consequently, critical maintenance mistakes and related costs, such as useless equipment replacement, may be significantly reduced.

Figure 1:
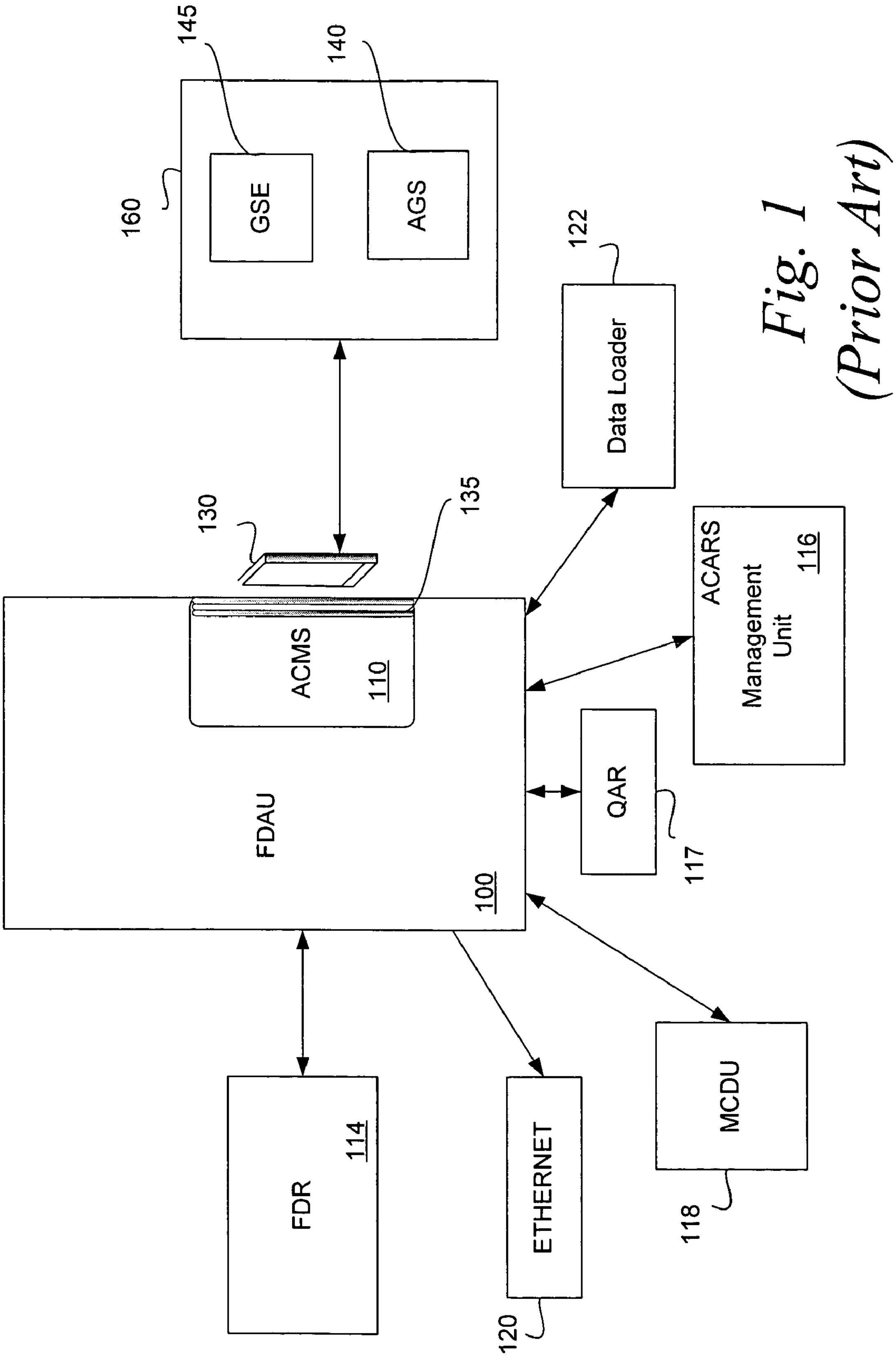
Fig. 1 (Prior Art)
FIG. 1 illustrates a prior art communication schema of an ACMS.
Figure 2:
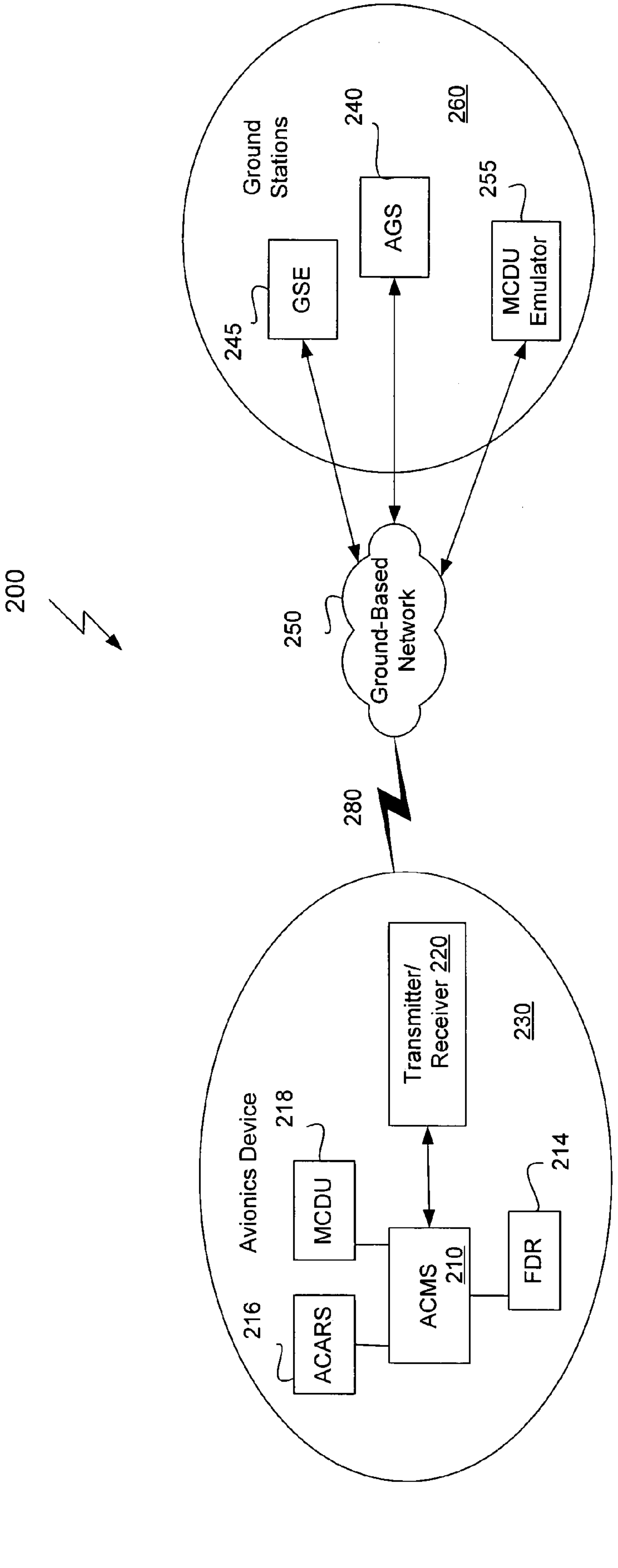
FIG. 2 illustrates an exemplary system for remotely communicating and interfacing with an ACMS.

FIG. 2 illustrates an exemplary system 200 for remotely communicating and interfacing with an ACMS 210. The exemplary system 200 provides wireless data transfer and wireless remote interface to an ACMS 210 located in an aircraft avionic device 230.

As noted above, the ACMS 110 records flight performance data from a plurality of acquisition equipments, such as sensors, on an aircraft. The ACMS 110 uses the flight performance data to generate real-time ACMS reports based on Federal Aviation Regulations (FAR) §121.344 parameters collected by a FDAU (not shown). These flight performance data are transmitted to a digital flight data recorder (FDR) 214.

The flight performance data may be transmitted to an ACARS 216. The flight performance data is also provided to a pilot interface, such as an MCDU 218. The MCDU 218 is located in the aircraft cockpit and enables a pilot to access all the flight performance data. The MCDU 218 may include a cockpit printer and an interface display unit (not shown).

The flight performance data are typically recorded back to a quick access recorder (QAR) (not shown). The QAR records the flight performance data on a storage card, such as a PCMCIA card 310 (shown in FIG. 3). The PCMCIA card 310 (shown in FIG. 3) can be plugged into a slot on the ACMS 210.

Referring to FIG. 2, the ACMS 210 is coupled to a transmitter/receiver 220 in the avionics device 230. The transmitter/receiver 220 may transmit the flight performance data to a ground-based network 250 and then to a ground station 260 through a wireless network 280. The ground station 260 may include a ground support equipment (GSE) 245 and an analysis ground station (AGS) 240. The GSE 245 includes programs that control how the ACMS 210 monitors engine performance and generates flight performance data. The AGS 240 analyzes flight performance data after the flight performance data is obtained by the ACMS 210 and transmitted to the ground station 260. The transmitter/receiver 220 may also receive software updates from the ground-based network 250 through the wireless network 280.

The ACMS 210 may communicate with the wireless network 280 through an interface, such as the PCMCIA card 310 (shown in FIG. 3) embedded with wired or wireless functionality and processing power. The method and system for remotely communicating and interfacing with the ACMS 210 is described in connection with a PCMCIA card interface for illustration purposes only. One skilled in the art will appreciate that other interface formats are equally applicable.

Examples of the wireless network 280 includes very high frequency (VHF) radio links, high frequency (HF) radio links, satellite communication links, and wireless spread spectrum links, such as wireless-fidelity (Wi-Fi) 802.11b. Wi-Fi 802.11b is easy to setup with low transmission cost. Any products tested and approved as "Wi-Fi Certified®" by the Wi-Fi Alliance are certified as interoperable with each other, even if they are from different manufacturers. A user with a "Wi-Fi Certified®" product can use any brand of access point with any other brand of client hardware that is also certified. Any Wi-Fi product using the same radio frequency (for example, 2.4 GHz for 802.11b or 11 g, 5 GHz for 802.11a) may work with one other, even if not "Wi-Fi Certified®."

The method and system for remotely communicating and interfacing with an ACMS is described in connection with Wi-Fi 802.11b communication protocol for illustration purposes only. One skilled in the art will appreciate that other types of communication protocol is equally applicable, such as Bluetooth, Wi-Fi 802.16, and the like. Bluetooth is a short-range radio technology aimed at simplifying communications among Internet devices and between devices and the Internet. Bluetooth also simplifies data synchronization between Internet devices and other computers.

The ground-based network 250 may be airline-owned network, airport-owned network, or a third-party owned network. Third-party owned networks can provide a virtual network for an airline to download the flight performance data. The ground-based network 250 communicates with GSE 245 and the AGS 240. As noted above, the GSE 245 monitors engine performance, whereas the AGS 240 analyzes the downloaded flight performance data. Through the wireless network 280, the AGS 240 may obtain real-time access to the flight performance data stored in the avionic device 230. Additionally, software upgrades may be loaded onto the ACMS 210 from the ground-based network 250 through the wireless network 280.

The exemplary system 200 offers real-time access to the flight performance data as well as to the ACMS 210 and ACMS peripherals, such as the DFDR, ACARS, MCDU and other LRUs, on board an aircraft. Real-time access allows the airline to perform distant tests and to obtain immediate responses from the ACMS 210. Referring to FIG. 2, the ground station 260 optionally includes a MCDU emulator 255 that emulates the MCDU 218 to obtain real time access to data generated by data management unit (DMU) of the MCDU 218. The MCDU 218 may be emulated at the ground station 260 when a wireless interface 390 (shown in FIG. 5) on the PCMCIA card 310 is controlled by software 330 (shown in FIG. 3) embedded in the ACMS 210.

The system 200 may be used with any existing ground-based network 250 as long as the network is Ethernet compliant or a bridge exists to an Ethernet compliant system. An aircraft can initiate flight performance data transmission when the aircraft arrives at an airport and recognizes a ground-based network 250. Alternatively, a ground-based network 250 may initiate the flight performance data transmission after recognizing a valid PCMCIA card 310 on an aircraft. Certain network recognition algorithm embedded in the PCMCIA card 310 enables the ground-based network 250 to recognize the PCMCIA card 310, and vise versa. The network recognition algorithm may use data included in a database storing wireless network attributes for different airports. The database may be accessed by the PCMCIA card 310. Examples of the wireless network attributes include network identification (ID), basic transmission control protocol (TCP) information, such as whether a server address is static or dynamic, power regulation in different countries, encryption data, and authentication data.

The network recognition algorithm may be implemented using, for example, software relating to access point, virtual private network (VPN), or radius authentication. Access point is a hardware device or a software that acts as a communication hub for users of a wireless device to connect to a wired LAN. Access points are important for providing heightened wireless security and for extending the physical range of service a wireless user has access to. VPN is a network that is constructed by using public wires to connect nodes. For example, a number of systems may enable a user to create networks using the Internet as the medium for transporting data. These systems may use encryption and other security mechanisms to ensure that only authorized users can access the network and that the data cannot be intercepted. Radius authentication is a system used by many Internet service providers (ISPs) that authorizes access to the ISP system. Users must enter username and password, which are passed to a radius server to check whether the information is correct.

Figure 3:
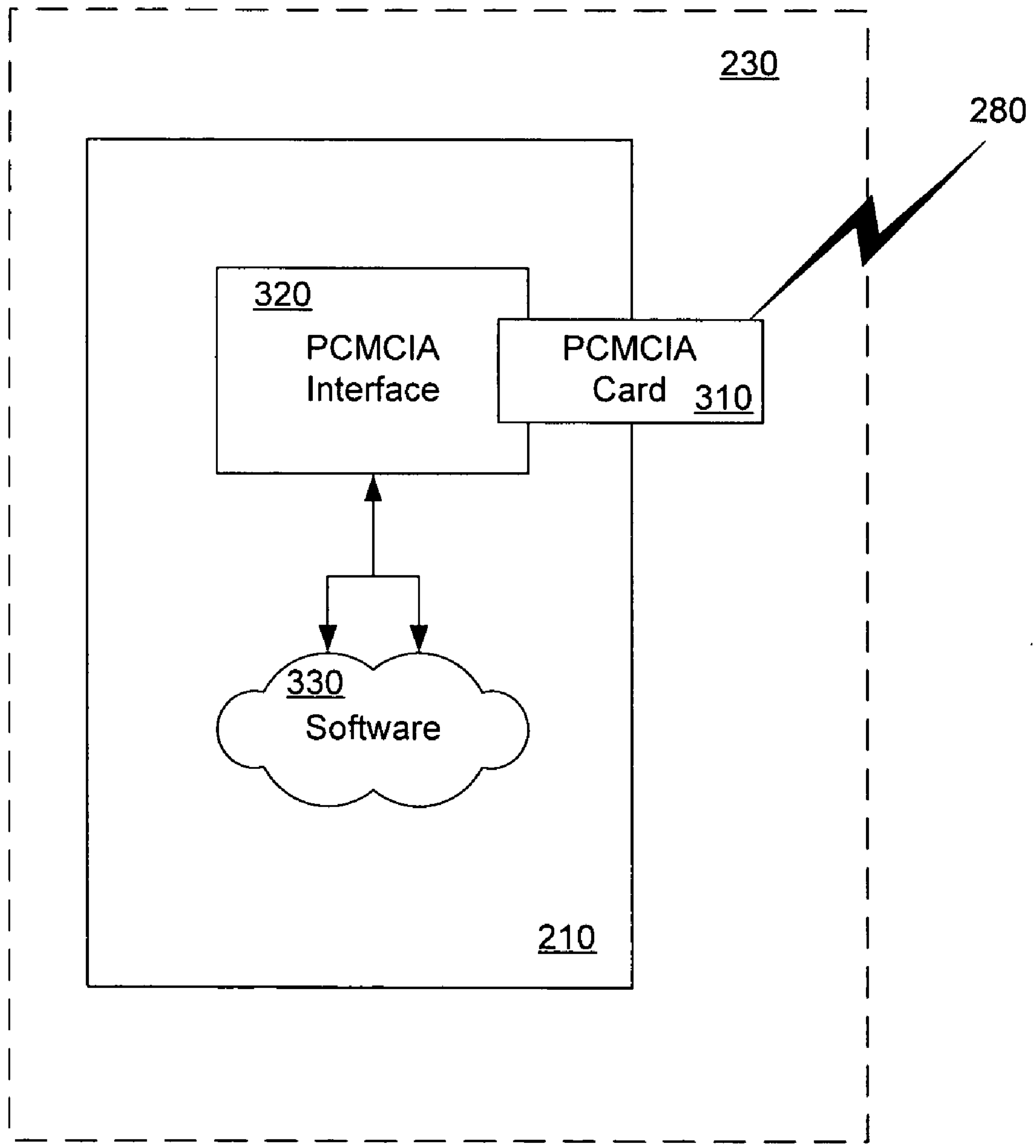
FIG. 3 illustrates a first exemplary embodiment of the system of FIG. 2 for remotely communicating and interfacing with the ACMS directly using a wireless network.

FIG. 3 illustrates a first exemplary embodiment of the system 200 for remotely communicating and interfacing with an ACMS directly using the wireless network 280. The system 200 includes a PCMCIA card 310 or an electronic device interfacing with a PCMCIA card 310. The PCMCIA card 310 has embedded wireless communication functionality and processing power in addition to the memory storage functionality. The PCMCIA card 310 may be plugged into any avionic device 230 used by airlines using a PCMCIA interface 320. The PCMCIA card 310 will be described in detail with respect to FIG. 5. In this embodiment, wireless communication functionality and processing power are embedded in the PCMCIA card 310. Software 330 embedded in the ACMS 210 and the avionic device 230 does not need to be modified to facilitate the wireless transmission of the flight performance data.

The processing power of the PCMCIA card 310 manages data transmission, controls wireless communication with different communication protocols, such as Internet protocol (IP), TCP, user datagram protocol (UDP), file transfer protocol (FTP), trivial file transfer protocol (TFTP), Telnet, secure shell (SSH), secure sockets layer (SSL), Internet protocol security (IPSec), and the like.

The processing power of the PCMCIA card 310 enables the ACMS 210 to communicate with the ground station 260 through the wireless network 280. Transmission typically should begin only when an aircraft has safely landed on the ground because only then is the flight performance data complete. To ensure that the aircraft is on the ground before starting any data transmission, the ACMS 210 generates an ACMS report based on FAR §121.344 parameters after one or more exclusive conditions, i.e., trigger events, are fulfilled. The processing power embedded in the PCMCIA card 310 detects when the ACMS report is generated by the ACMS 210 and starts data transmission only after the ACMS report is generated.

Examples of such trigger events include the opening of cargo doors, the weight on the wheels equaling one, the ground speed reaching zero, the engine fuel flow reaching zero, the close of fuel valves, and the like. The ACMS report may also include a routing table that stores connectivity details, such as whether a ground-based network 250 is equipped and therefore able to receive data; where and how to send the data to the ground-based network 250; how to connect to a particular ground-based network 250 in an airport; whether the flight performance data needs to be erased once download is complete; or how to access the flight performance data according to a particular country rule. For example, the FCC in the United States allows a higher emission threshold than is allowed in Europe. As a result, it is important to determine in which continent the wireless communication can be set up. ACMS reports are well known in the art.

The processing power of the PCMCIA card 310 also detects the types of ground-based network 250 that the ACMS 210 communicates with depending on the precise location of the aircraft. At the end of a flight and upon the occurrence of one or more trigger events, the method for remotely communicating and interfacing with the ACMS 210 connects a wireless interface 390 (shown in FIG. 5) embedded in the PCMCIA card 310 to the ground-based network 250 based on network attributes stored in the database on the PCMCIA card 310. Thereafter, the flight performance data stored on the PCMCIA card 310 may be encrypted and sent, over the wireless network 280, to the ground station 260.

The processing power of the PCMCIA card 310 may use global positioning system (GPS) to determine the location of the aircraft. GPS systems are well known in the art. GPS provides specially coded satellite (SV) timing signals that can be processed in a GPS receiver, enabling the receiver to accurately compute position, velocity and time. Specifically, GPS is a worldwide medium earth orbit (MEO) satellite navigational system formed by twenty-four satellites orbiting the earth and corresponding receivers on the earth. The satellites orbit the earth at approximately 12,000 miles above the surface and make two complete orbits every twenty-four hours. The GPS satellites continuously transmit digital radio signals that contain data on the satellites location and the exact time to the earth-bound receivers. The satellites are equipped with atomic clocks that are precise to within a billionth of a second. Based on this information the receivers know how long it takes for the signal to reach receivers on earth. As each signal travels at the speed of light, the longer it takes a receiver to get the signal, the farther away the satellite is. By using three satellites, GPS can calculate the longitude and latitude of the receiver based on where the three spheres intersect. By using four satellites, GPS can also determine altitude.

The method and system for remotely communicating and interfacing with the ACMS 210 may employ several security measures to certify data integrity and to secure the access of the flight performance data. In particular, Wi-Fi 802.11b is associated with multiple security protocols, such as wired equivalent privacy (WEP), Wi-Fi protected access (WPA), advanced encryption standard (AES), and extensible authentication protocol (EAP).

WEP is a security protocol for wireless local area networks (WLANs) defined in the 802.11b standard. WEP is designed to provide the same level of security as that of a wired LAN. LANs are inherently more secure than WLANs because LANs are somewhat protected by the physicality of their structure, having some or all part of the network inside a building that can be protected from unauthorized access. WLANs, which uses radio waves to communicate between nodes, do not have the same physical structure and therefore are more vulnerable to tampering. WEP aims to provide security by encrypting data over radio waves so that the data is protected while being transmitted from one end point to another. Some examples of encryption algorithms can be found, for example, at: http://www.drizzle.com/~aboba/IEEE/.

WPA is a Wi-Fi standard that was designed to improve upon the security features of WEP. WPA is designed to work with existing Wi-Fi products that have been enabled with WEP. WPA includes two improvements over WEP. WPA has improved data encryption through temporal key integrity protocol (TKIP). TKIP scrambles the keys using a hashing algorithm and, by adding an integrity-checking feature, ensures that the keys haven't been tampered with. WPA also offers user authentication through the EAP. WEP regulates access to a wireless network based on a computer's hardware-specific media access control (MAC) address. Details on WPA can be found at: http://www.wifialliance.com/OpenSection/protected_access.asp.

AES is a symmetric 128-bit block data encryption technique that works at multiple network layers simultaneously. EAP is built on a more secure public-key encryption system to ensure that only authorized network users can access the network. EAP is a general protocol for authentication that also supports multiple authentication methods, such as token cards, Kerberos, one-time passwords, certificates, public key authentication and smart cards. In wireless communications using EAP, a user requests connection to a WLAN through an access point, which then requests the identity of the user and transmits that identity to an authentication server. The server asks the access point for proof of identity, which the access point gets from the user and then sends back to the server to complete the authentication.

The method and system for remotely communicating and interfacing with the ACMS 210 may further check to confirm whether the ground-based network 250 is indeed the correct network to receive the flight performance data using the network recognition algorithm.

From the ground station 260, as additional security measures, the airline may restrict physical access of the AGS computers to airline personnel, restrict user access to system administrators, encrypt and compress files arrived, and restrict software privileges to read only, and delete the flight performance data from the AGS computers after the data are copied to a system controller server.

As a further security measure, the PCMCIA card 310 may run on a listening mode. In other words, the PCMCIA card 310 does not start data transmission until certain conditions change, such as the occurrence of the one or more trigger events.

Figure 5:
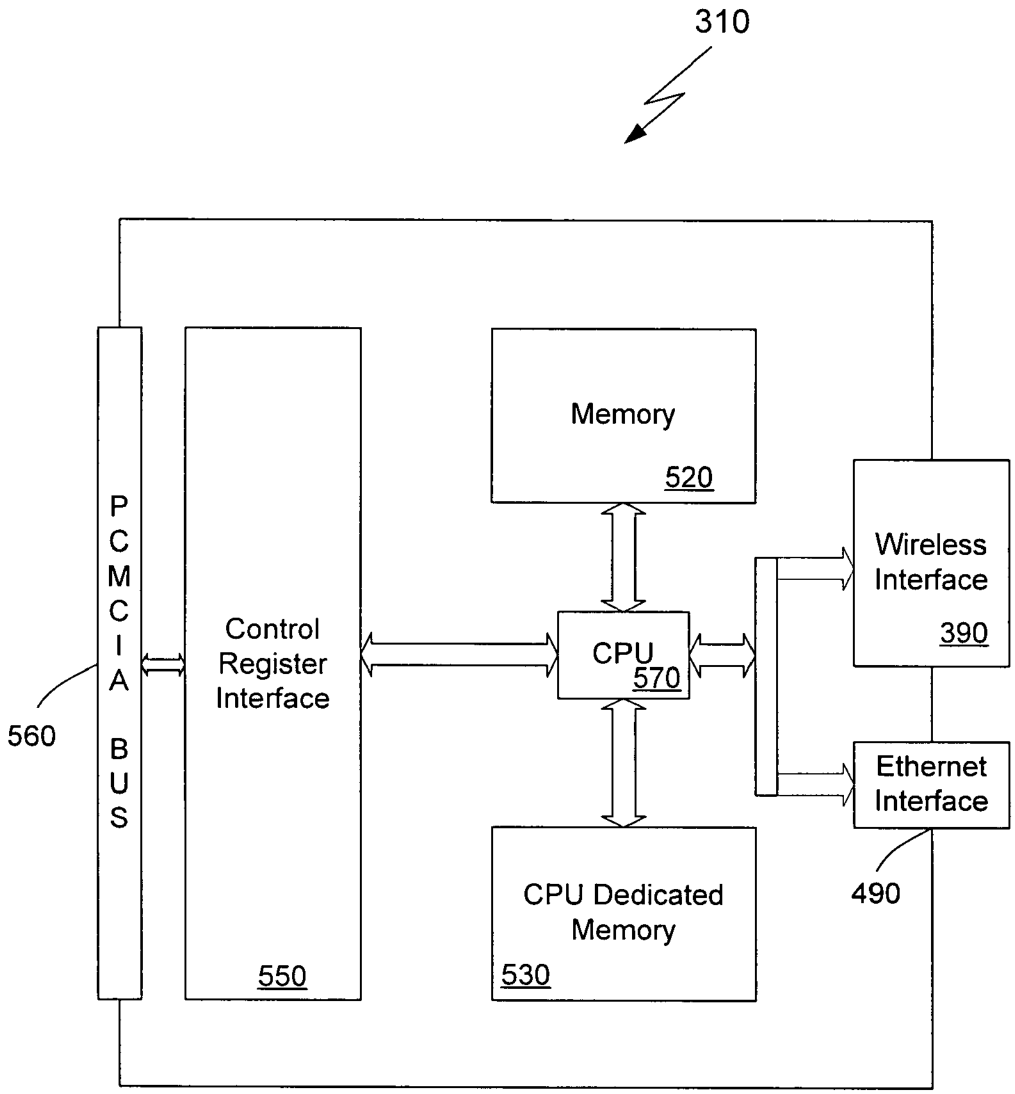
FIG. 5 illustrates an exemplary personal computer memory card international association (PCMCIA) card utilized by the system of FIG. 2 for remotely communicating and interfacing with the ACMS.

In operation, the exemplary PCMCIA card 310 stores ACMS reports and flight performance data onto an embedded memory 520, 530 (shown in FIG. 5). The processing power in the PCMCIA card 310 further determines whether and when all the security measures and the exclusive conditions, i.e., trigger events, are fulfilled. After the required security measures and the exclusive conditions have been fulfilled, the processing power embedded on the PCMCIA card 310 may gather the flight performance data from the memory 520, 530 (shown in FIG. 5) and transmit the flight performance data to the ground station 260 through the wireless network 280. Upon transfer completion and reception of a completion acknowledgement from the ground station 260, the flight performance data may optionally be erased from the memory 520, 530 (shown in FIG. 5) on the PCMCIA card 310.

The flight performance data may be thoroughly and comprehensively analyzed to prevent failures of aircraft engine parts. The analysis may detect, for example, increased vibration in some parts of the aircraft and perform appropriate maintenance. By performing maintenance whenever necessary, rather than on a fixed schedule, the method and system can prolong the life of the aircraft engine.

Figure 4:
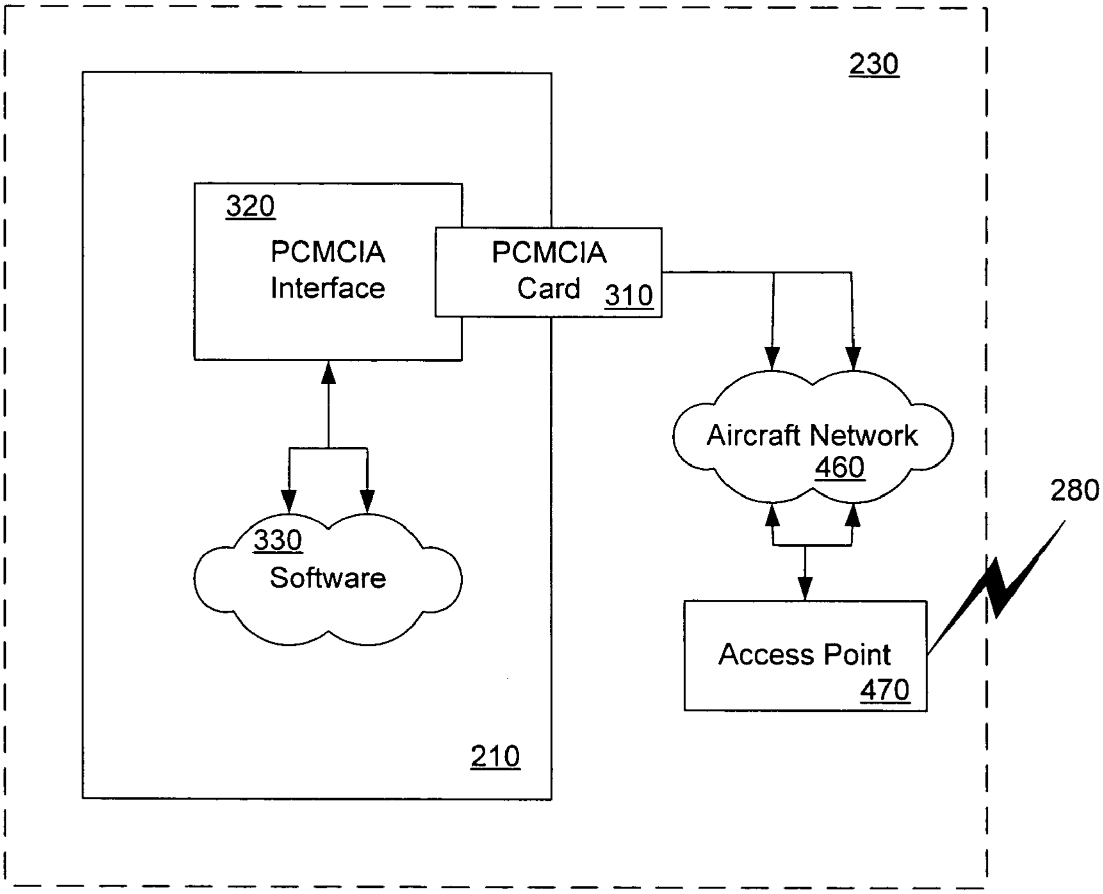
FIG. 4 illustrates a second exemplary embodiment of the system of FIG. 2 for remotely communicating and interfacing with the ACMS through a wired network on an aircraft.

FIG. 4 illustrates a second exemplary embodiment of the system for remotely communicating and interfacing with the ACMS 210 through a wired network on an aircraft. In this embodiment, the PCMCIA card 310 connects to the wireless network 280 through a wired aircraft network 460, such as an Ethernet, and an access point 470. The access point 470 is provided to establish a connection with the ground-based network 250. The method and system for remotely communicating and interfacing with the ACMS 210 is described in connection with Ethernet for illustration purposes only. One skilled in the art will readily appreciate that other types of LAN architecture is equally applicable.

The access point 470 may be a hardware device with one or more antennas to perform data transmission between a wired network and a wireless network. The PCMCIA card 310 has embedded wired communication functionality and processing power in addition to the memory storage functionality. The PCMCIA card 310 may be plugged into any avionic device 230 used by airlines using a PCMCIA interface 320. As noted above, the PCMCIA card 310 will be described in detail with respect to FIG. 5. Wireless communication is performed at the access point 470. Software 330 embedded in the ACMS 210 and the avionic device 230 does not need to be modified to facilitate the wireless transmission of the flight performance data.

Similar to the embodiment described with respect to FIG. 3, the processing power that controls the communication and transmission of the flight performance data is embedded in the PCMCIA card 310. The method determines whether there is a connection available between the PCMCIA card 310 and the ground station 260. The flight performance data is then transmitted to the ground station 260 through the available connection.

FIG. 5 illustrates an exemplary PCMCIA card 310 utilized by the method and system 200 for remotely communicating and interfacing with the ACMS 210. As noted above, the PCMCIA card 310 has embedded wired or wireless communication functionality and processing power in addition to the memory storage functionality. The PCMCIA card 310 stores ACMS reports and flight performance data onto a memory 520. The PCMCIA card 310 includes a central processing unit (CPU) 510. The CPU 510 is couples to the avionic device 230 through a PCMCIA bus 560 and a control register interface 550. The CPU 510 is couples to a CPU dedicated memory 530. The CPU dedicated memory 530 may include a program to be executed by the CPU 510 to transmit the flight performance data upon the occurrence of one or more trigger events.

The CPU 510 communicates with a ground-based network 250 through an interface 390, 490. For wireless network communication described above with respect to FIG. 3, the CPU 510 communicates directly with the wireless network 280 through a wireless interface 390, such as a Wi-Fi interface. For wired network communication described above with respect to FIG. 4, the CPU 510 communicates with Ethernet 460 through an Ethernet interface 490. Data is then transmitted to the ground-based network 250 using the access point 470 and the wireless network 280.

The memory 520, which stores ACMS reports and flight performance data, may include a flash component (not shown) for storage and a cache random access memory (RAM) component (not shown). Because the PCMCIA card 310 can be plugged into any avionic device 230, no system modification, either hardware or software, is needed to facilitate the wireless transmission of the flight performance data from the ACMS 210.

Figure 6:
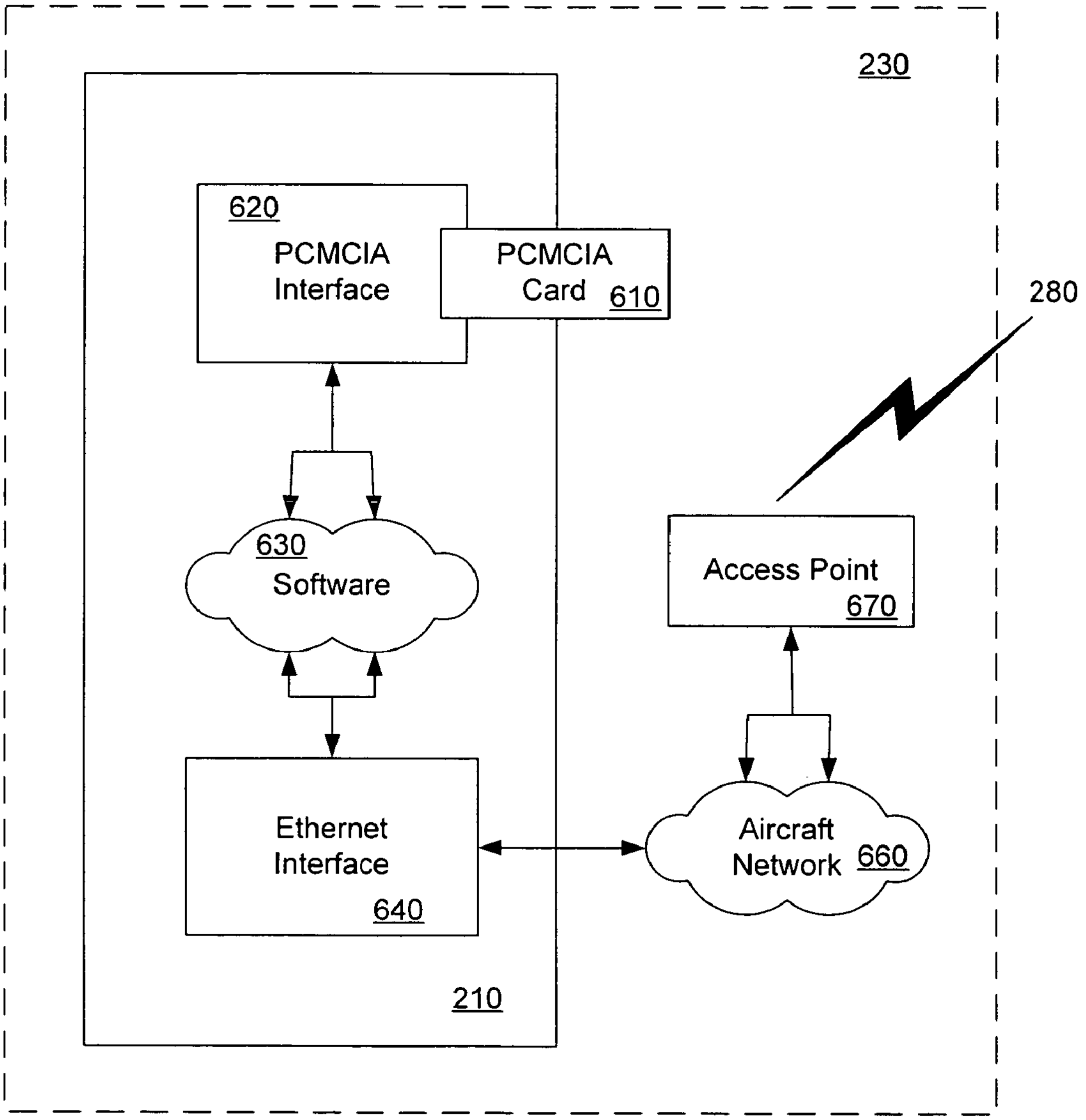
FIG. 6 illustrates a third exemplary embodiment of the system of FIG. 2 for remotely communicating and interfacing with the ACMS with certain software modification.

FIG. 6 illustrates a third exemplary embodiment of the system for remotely communicating and interfacing with the ACMS 210 with certain software modification. The system 200 includes a PCMCIA card 610 or an electronic device interfacing with a PCMCIA card 610. The PCMCIA card 610 can be plugged into the avionic device 230 using an PCMCIA interface 620. This embodiment employs an Ethernet interface 640 for the wireless data transmission. A software link 630 may be created between the Ethernet interface 640 and the PCMCIA interface 620, allowing access to the data residing on the PCMCIA card 610 through the Ethernet interface 640. A wired aircraft network 660, such as an Ethernet, connects the avionic device 230 to the wireless network 280 through the Ethernet interface 640 and an access point 670 located on the aircraft. Wireless communication is performed at the access point 670 coupled to the aircraft network 660. Certain modification to software 630 embedded in the ACMS 210 is necessary to control data transmission in this embodiment.

The processing power that controls the communication and transmission of the flight performance data is embedded in the software 630 in the avionic device 230. The access point 670 may be used to establish a connection with the ground-based network 250. The method then detects whether there is a connection available between the PCMCIA card 610 and the ground station 260 after one or more exclusive conditions are fulfilled. The flight performance data is transmitted directly from the PCMCIA card 610 to the ground station 260 through the available connection.

Figure 7:
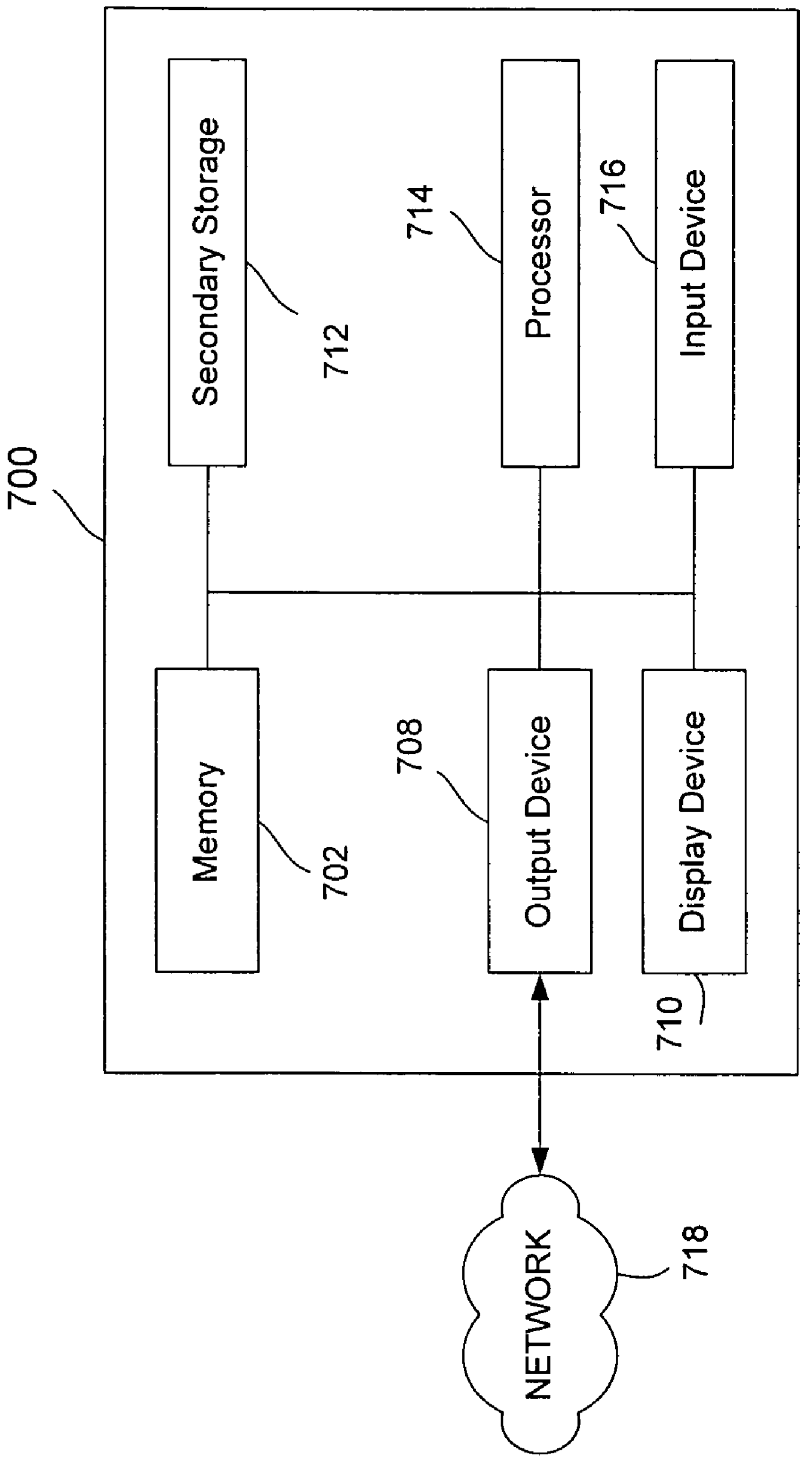
FIG. 7 illustrates exemplary hardware components of a computer that may be used in connection with an exemplary method for remotely communicating and interfacing with the ACMS.

FIG. 7 illustrates exemplary hardware components of a computer 700 that may be used in connection with an exemplary method for remotely communicating and interfacing with the ACMS 210. The computer 700 includes a connection with a network 718 such as the Internet or other type of computer or telephone network. The computer 700 typically includes a memory 702, a secondary storage device 712, a processor 714, an input device 716, a display device 710, and an output device 708.

The memory 702 may include random access memory (RAM) or similar types of memory. The secondary storage device 712 may include a hard disk drive, floppy disk drive, CD-ROM drive, or other types of non-volatile data storage, and may correspond with various databases or other resources. The processor 714 may execute information stored in the memory 702, the secondary storage 712, or received from the Internet or other network 718. The input device 716 may include any device for entering data into the computer 700, such as a keyboard, keypad, cursor-control device, touch-screen (possibly with a stylus), or microphone. The display device 710 may include any type of device for presenting visual image, such as, for example, a computer monitor, flat-screen display, or display panel. The output device 708 may include any type of device for presenting data in hard copy format, such as a printer, and other types of output devices including speakers or any device for providing data in audio form. The computer 700 can possibly include multiple input devices, output devices, and display devices.

Although the computer 700 is depicted with various components, one skilled in the art will appreciate that the computer 700 can contain additional or different components. In addition, although aspects of an implementation consistent with the method for remotely communicating and interfacing with the ACMS 210 are described as being stored in memory, one skilled in the art will appreciate that these aspects can also be stored on or read from other types of computer program products or computer-readable media, such as secondary storage devices, including hard disks, floppy disks, or CD-ROM; a carrier wave from the Internet or other network; or other forms of RAM or ROM. The computer-readable media may include instructions for controlling the computer 700 to perform a particular method.

Figure 8:
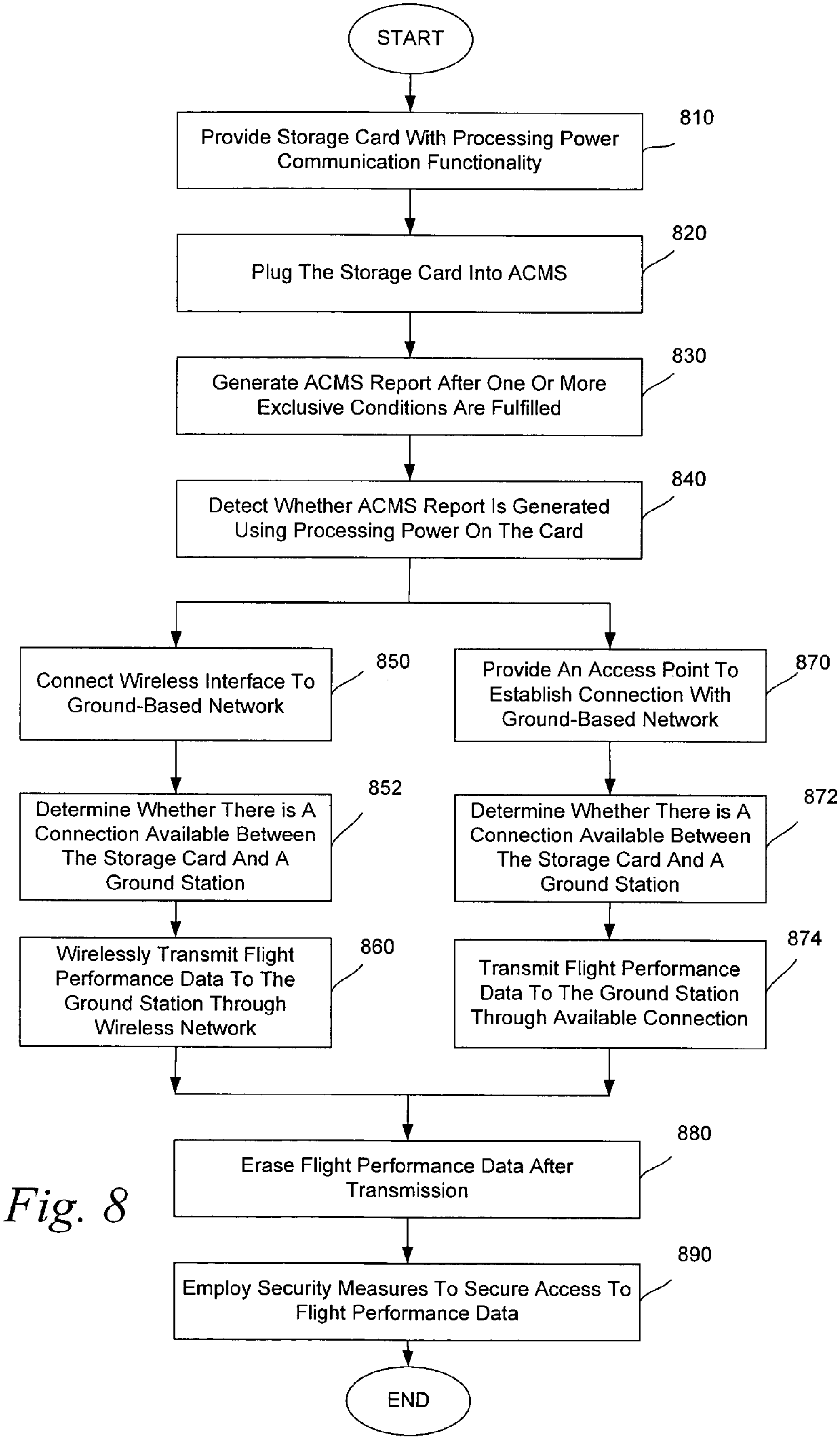
FIG. 8 is a flow chart of the first and second exemplary embodiments of the exemplary method for remotely communicating and interfacing with the ACMS.

FIG. 8 is a flow chart of the first and second exemplary embodiments of the exemplary method for remotely communicating and interfacing with the ACMS 210. The method provides a storage card, such as the PCMCIA card 310, with processing power and wireless or wired transmission functionality (block 810). The storage card includes a wireless interface 390 or a wired Ethernet interface 490. The storage card may be plugged into the ACMS 210 using a card interface, such as the PCMCIA interface 320 (block 820). The ACMS 210 collects flight performance data and generates an ACMS report after one or more exclusive conditions are fulfilled (block 830). The storage card uses the processing power to detect whether the ACMS report is generated (block 840).

In the first exemplary embodiment, after the one or more exclusive conditions are fulfilled, the method connects the wireless interface 390 to the ground-based network 250 based on network attributes stored in a database on the storage card (block 850). The method then determines whether there is a connection available between the storage card and a ground station 260 (block 852). Next, the method wirelessly transmits the flight performance data to a ground station 260 through a wireless network 280 (block 860).

In the second exemplary embodiment, the method provides an access point 470 to establish a connection with a ground-based network 250 (block 870). The method then determines whether there is a connection available between the storage card and a ground station 260 (block 872). Next, the flight performance data is transmitted to the ground station 260 through the available connection (block 874). The method then optionally erases the flight performance data from the storage card after the transmission (block 880). The method may also employ security measures to secure an access to the flight performance data (block 890).

Figure 9:
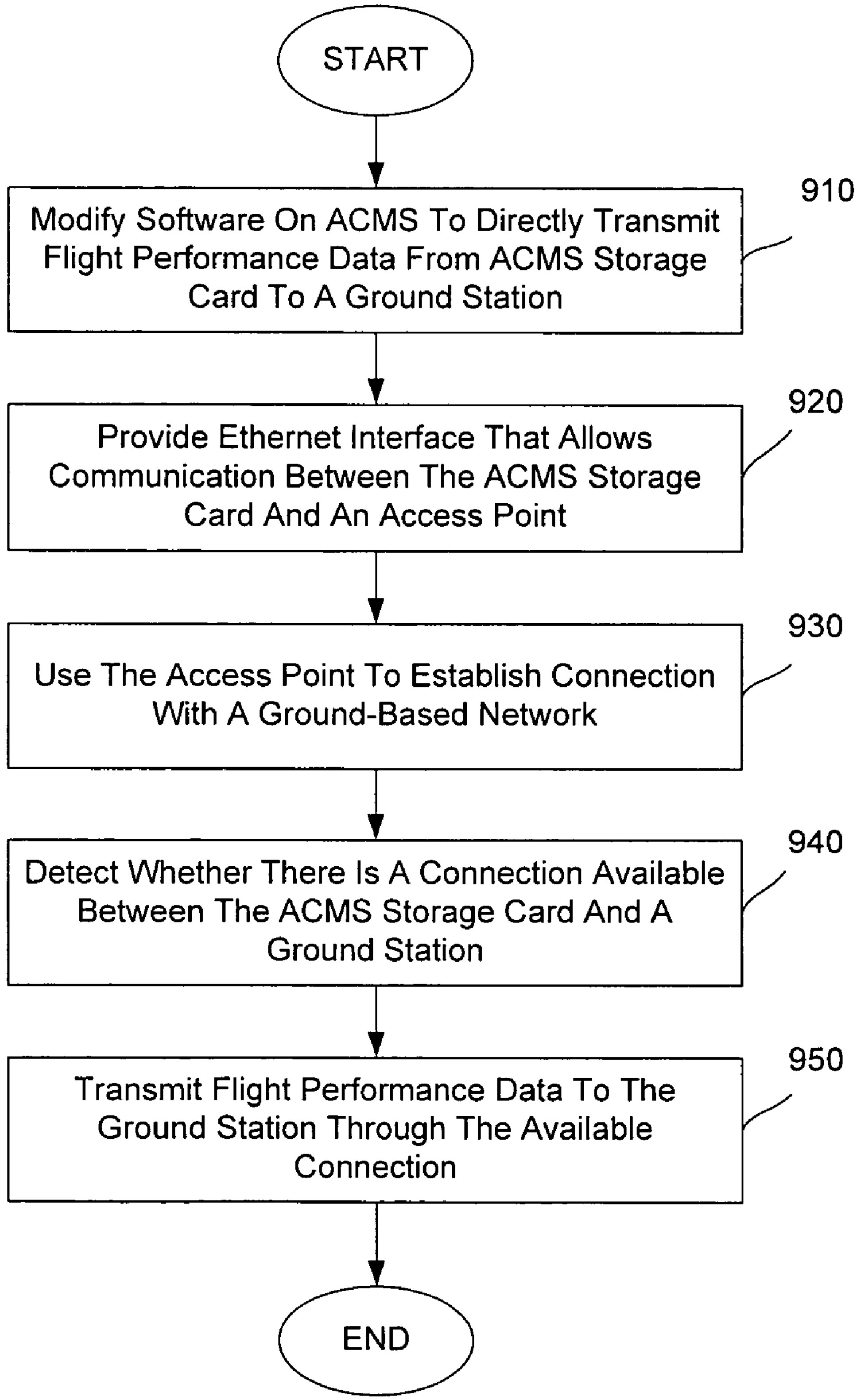
FIG. 9 is a flow chart of the third exemplary embodiment of the exemplary method for remotely communicating and interfacing with the ACMS.

FIG. 9 is a flow chart of the third exemplary embodiment of the exemplary method for remotely communicating and interfacing with the ACMS 210. The method modifies software on the ACMS 210 to directly transmit flight performance data from an ACMS storage card to a ground station 260 (block 910). The method also provides an Ethernet interface 640 that allows communication between the ACMS storage card and an access point 670 (block 920). The access point 670 may be used to establish a connection with a ground-based network 250 (block 930). The method then detects whether there is a connection available between the ACMS storage card and a ground station 260 (block 940). Next, the method transmits the flight performance data to the ground station 260 through the available connection directly from the ACMS storage card (block 950).

While the method and apparatus for remotely communicating and interfacing with the ACMS 210 have been described in connection with an exemplary embodiment, those skilled in the art will understand that many modifications in light of these teachings are possible, and this application is intended to cover any variations thereof.

What is claimed is:

1. A Personal Computer Memory Card International Association (PCMCIA) card for remotely communicating and interfacing with flight performance data on an aircraft, the PCMCIA card comprising:

a central processing unit (CPU) providing processing power and wireless transmission functionality, wherein the PCMCIA card is capable of being plugged into an Aircraft Condition Monitoring System (ACMS) using an existing card interface, the ACMS generating an ACMS report after one or more exclusive conditions are fulfilled, and wherein the PCMCIA card uses the CPU to detect whether the ACMS report is generated;

a wireless interface controlled by the CPU, the wireless interface connecting the CPU to a wireless network; and a memory coupled to the CPU through a communication bus, the memory storing flight performance data, wherein the CPU wirelessly transmits the flight performance data stored in the memory to a ground station through the wireless network after the one or more exclusive conditions are fulfilled and the ACMS report is generated.

2. The PCMCIA card of claim 1, wherein the CPU determines whether there is a connection available between the PCMCIA card and the ground station.

3. The PCMCIA card of claim 1, wherein the memory includes a database for storing wireless network attributes for different airports.

4. The PCMCIA card of claim 3, wherein the wireless network attributes include one or more of network identification, basic transmission control protocol (TCP) information, power regulation, encryption data, and authentication data.

5. The PCMCIA card of claim 1, wherein the wireless interface is controlled by software embedded in the ACMS.

6. The PCMCIA card of claim 1, further comprising a PCMCIA bus coupled to the CPU, the PCMCIA bus connecting the CPU to the ACMS.

7. The PCMCIA card of claim 1, wherein the flight performance data are erased from the memory after the transmission.

8. The PCMCIA card of claim 1, wherein the CPU employs security measures to secure an access to the flight performance data.

9. The PCMCIA card of claim 8, wherein the security measures include encrypting the flight performance data during transmission.

10. The PCMCIA card of claim 8, wherein the security measures include employing wired equivalent privacy (WEP) during transmission.

11. The PCMCIA card of claim 8, wherein the security measures include employing wireless-fidelity protected access (WPA) during transmission.

12. The PCMCIA card of claim 8, wherein the security measures include employing advanced encryption standard (AES) during transmission.

13. The PCMCIA card of claim 8, wherein the security measures include employing extensible authentication protocol (EAP) during transmission.

14. The PCMCIA card of claim 1, wherein the wireless network is a wireless-fidelity (Wi-Fi) 802.11b network.

15. A Personal Computer Memory Card International Association (PCMCIA) card for remotely communicating and interfacing with flight performance data on an aircraft, the PCMCIA card capable of being plugged into an Aircraft Condition Monitoring System (ACMS) using an existing card interface, the ACMS generating an ACMS report after one or more exclusive conditions are fulfilled, the PCMCIA card comprising:

a central processing unit (CPU) providing processing power and wireless transmission functionality, wherein the PCMCIA card uses the CPU to detect whether the ACMS report is generated;

a wireless interface controlled by the CPU, the wireless interface connecting the CPU to a wireless network; and a memory coupled to the CPU through a communication bus, the memory storing flight performance data, wherein the CPU wirelessly transmits the flight performance data stored in the memory to a ground station through the wireless network after the one or more exclusive conditions are fulfilled and the ACMS report is generated, and wherein the ACMS report is generated when cargo doors of the aircraft are open.

16. A Personal Computer Memory Card International Association (PCMCIA) card for remotely communicating and interfacing with flight performance data on an aircraft, the PCMCIA card capable of being plugged into an Aircraft Condition Monitoring System (ACMS) using an existing card interface, the ACMS generating an ACMS report after one or more exclusive conditions are fulfilled, the PCMCIA card comprising:

a central processing unit (CPU) providing processing power and wireless transmission functionality, wherein the PCMCIA card uses the CPU to detect whether the ACMS report is generated;

a wireless interface controlled by the CPU, the wireless interface connecting the CPU to a wireless network; and a memory coupled to the CPU through a communication bus, the memory storing flight performance data, wherein the CPU wirelessly transmits the flight performance data stored in the memory to a ground station through the wireless network after the one or more exclusive conditions are fulfilled and the ACMS report is generated, and wherein the ACMS report is generated when a ground speed of the aircraft reaches zero.

17. A Personal Computer Memory Card International Association (PCMCIA) card for remotely communicating and interfacing with flight performance data on an aircraft, the PCMCIA card capable of being plugged into an Aircraft Condition Monitoring System (ACMS) using an existing card interface, the ACMS generating an ACMS report after one or more exclusive conditions are fulfilled, the PCMCIA card comprising:

a central processing unit (CPU) providing processing power and wireless transmission functionality, wherein the PCMCIA card uses the CPU to detect whether the ACMS report is generated;

a wireless interface controlled by the CPU, the wireless interface connecting the CPU to a wireless network; and a memory coupled to the CPU through a communication bus, the memory storing flight performance data, wherein the CPU wirelessly transmits the flight performance data stored in the memory to a ground station through the wireless network after the one or more exclusive conditions are fulfilled and the ACMS report is generated, and wherein the ACMS report is generated when an engine fuel flow reaches zero.

18. A Personal Computer Memory Card International Association (PCMCIA) card for remotely communicating and interfacing with flight performance data on an aircraft, the PCMCIA card capable of being plugged into an Aircraft Condition Monitoring System (ACMS) using an existing card interface, the ACMS generating an ACMS report after one or more exclusive conditions are fulfilled, the PCMCIA card comprising:

a central processing unit (CPU) providing processing power and wireless transmission functionality, wherein the PCMCIA card uses the CPU to detect whether the ACMS report is generated;

a wireless interface controlled by the CPU, the wireless interface connecting the CPU to a wireless network; and a memory coupled to the CPU through a communication bus, the memory storing flight performance data, wherein the CPU wirelessly transmits the flight performance data stored in the memory to a ground station through the wireless network after the one or more exclusive conditions are fulfilled and the ACMS report is generated, and wherein the ACMS report is generated when fuel valves of the aircraft are closed.

19. The PCMCIA card of claim 1, wherein the PCMCIA card enables remotely access to the ACMS and ACMS peripherals from the ground station.

20. A Personal Computer Memory Card International Association (PCMCIA) card for remotely communicating and interfacing with flight performance data on an aircraft, the PCMCIA card comprising:

a central processing unit (CPU) providing processing power and wired transmission functionality, wherein the PCMCIA card is capable of being plugged into an Aircraft Condition Monitoring System (ACMS) using an existing card interface, the ACMS generating an ACMS report after one or more exclusive conditions are fulfilled, and wherein the PCMCIA card uses the CPU to detect whether the ACMS report is generated;

an Ethernet interface coupled to the CPU, the Ethernet interface connecting the CPU to a wired network on the aircraft; and a memory coupled to the CPU through a communication bus, the memory storing flight performance data, wherein the CPU transmits the flight performance data stored in the memory to the wired network after the one or more exclusive conditions are fulfilled and the ACMS report is generated, and wherein the wired network transmits the flight performance data to a ground station.

21. The PCMCIA card of claim 20, wherein the CPU determines whether there is a connection available between the PCMCIA card and the ground station.

22. The PCMCIA card of claim 20, wherein the wired network transmits the flight performance data to the ground station through an access point located on the aircraft and a wireless network.

23. The PCMCIA card of claim 22, wherein the wireless network is a wireless-fidelity (Wi-Fi) 802.11b network.

24. The PCMCIA card of claim 20, wherein the memory includes a database for storing wireless network attributes for different airports.

25. The PCMCIA card of claim 24, wherein the wireless network attributes include one or more of network identification, basic transmission control protocol (TCP) information, power regulation, encryption data, and authentication data.

26. The PCMCIA card of claim 20, wherein the Ethernet interface is controlled by software embedded in the ACMS.

27. The PCMCIA card of claim 20, further comprising a PCMCIA bus coupled to the CPU, the PCMCIA bus connecting the CPU to the ACMS.

28. The PCMCIA card of claim 20, wherein the wired network is an Ethernet.

29. The PCMCIA card of claim 20, wherein the flight performance data are erased from the memory after the transmission.

30. The PCMCIA card of claim 20, wherein the CPU employs security measures to secure an access to the flight performance data.

31. The PCMCIA card of claim 30, wherein the security measures include encrypting the flight performance data during transmission.

32. The PCMCIA card of claim 30, wherein the security measures include employing wired equivalent privacy (WEP) during transmission.

33. The PCMCIA card of claim 30, wherein the security measures include employing wireless-fidelity protected access (WPA) during transmission.

34. The PCMCIA card of claim 30, wherein the security measures include employing advanced encryption standard (AES) during transmission.

35. The PCMCIA card of claim 30, wherein the security measures include employing extensible authentication protocol (EAP) during transmission.

36. A Personal Computer Memory Card International Association (PCMCIA) card for remotely communicating and interfacing with flight performance data on an aircraft, the PCMCIA card capable of being plugged into an Aircraft Condition Monitoring System (ACMS) using an existing card interface, the ACMS generating an ACMS report after one or more exclusive conditions are fulfilled, the PCMCIA card comprising:

a central processing unit (CPU) providing processing power and wired transmission functionality, wherein the PCMCIA card uses the CPU to detect whether the ACMS report is generated;

an Ethernet interface coupled to the CPU, the Ethernet interface connecting the CPU to a wired network on the aircraft; and a memory coupled to the CPU through a communication bus, the memory storing flight performance data, wherein the CPU transmits the flight performance data stored in the memory to the wired network after the one or more exclusive conditions are fulfilled and the ACMS report is generated, wherein the one or more exclusive conditions include one of a group comprising cargo doors of the aircraft being open, a weight on wheels of the aircraft equaling one, a ground speed of the aircraft reaching zero, an engine fuel flow reaching zero, and fuel valves of the aircraft being closed, and wherein the wired network transmits the flight performance data to a ground station.

* * * * *